May 31, 1955         S. KRASNOW ET AL         2,709,753
TEMPERATURE COMPENSATED BORE HOLE RADIOACTIVITY APPARATUS
Original Filed Oct. 1, 1941                 4 Sheets-Sheet 1
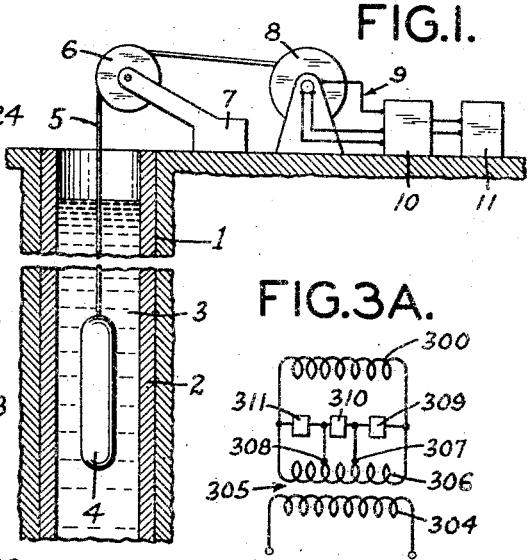
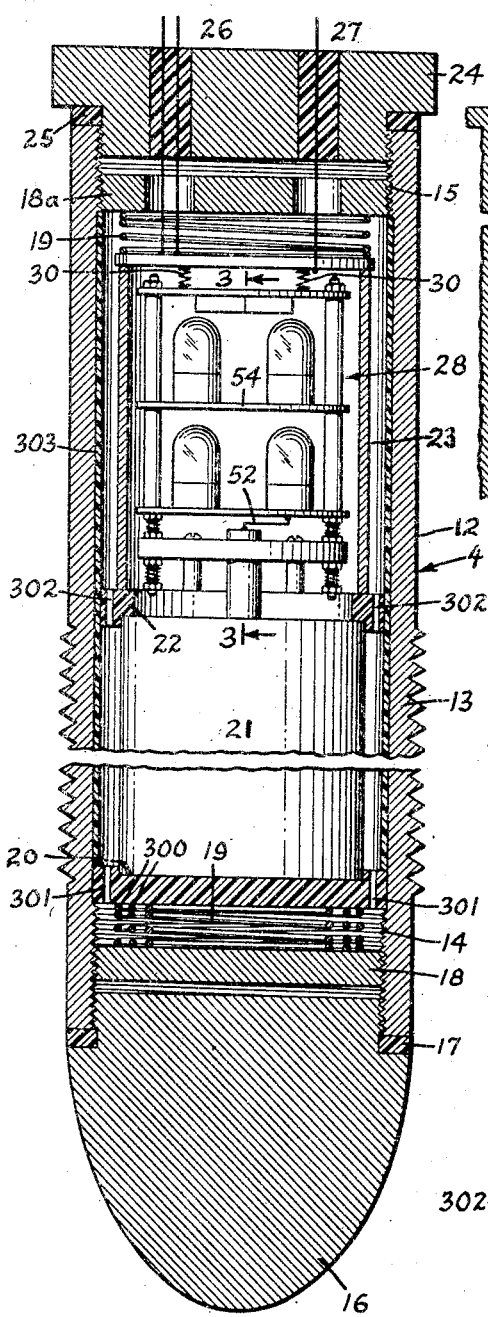
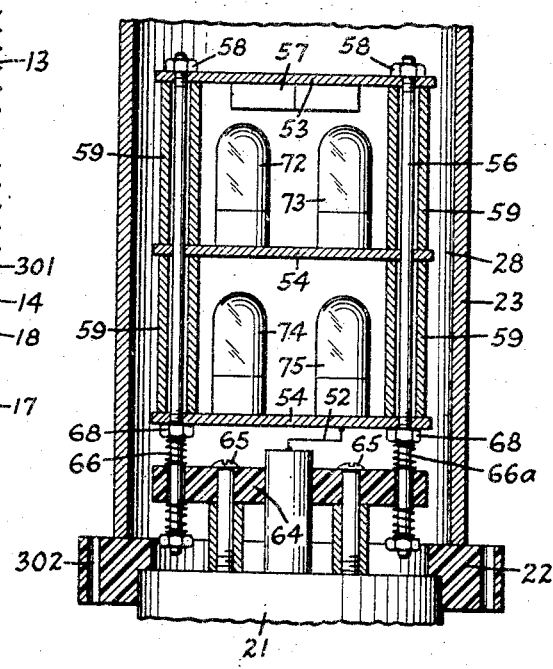
INVENTORS.
SHELLEY KRASNOW
MEYER JOSEPH TEST
BY
*Campbell, Brumbaugh, Free & Graves*
THEIR ATTORNEYS.

May 31, 1955     S. KRASNOW ET AL     2,709,753
TEMPERATURE COMPENSATED BORE HOLE RADIOACTIVITY APPARATUS
Original Filed Oct. 1, 1941     4 Sheets-Sheet 2
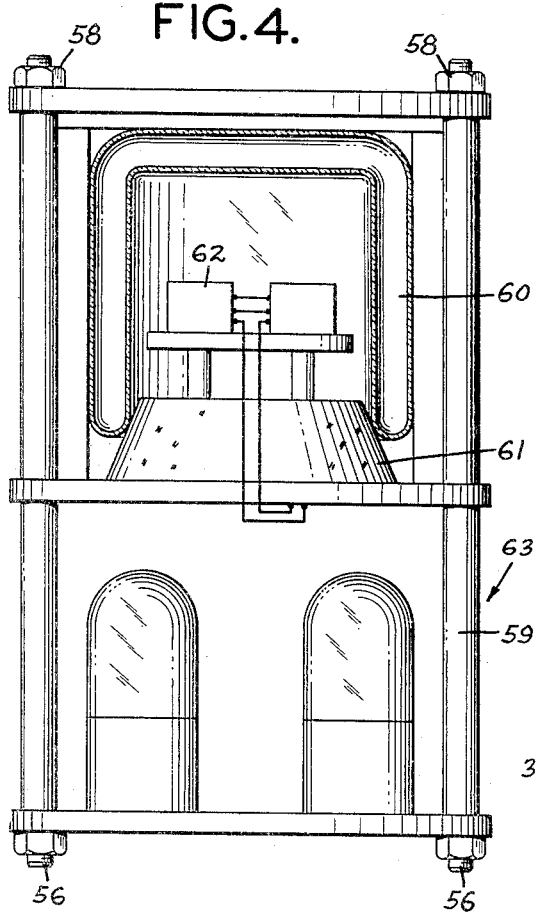
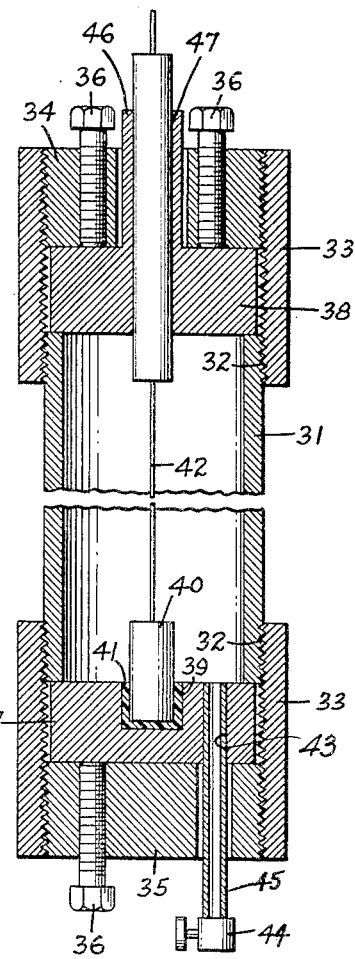
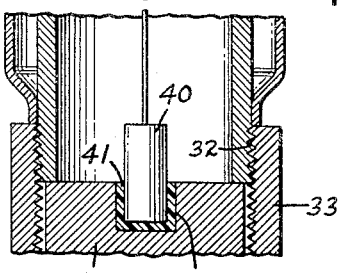
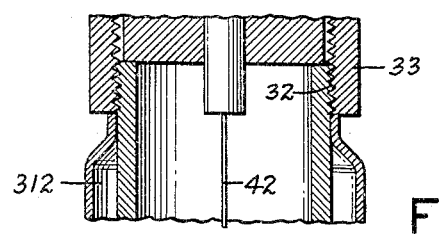
INVENTORS.
SHELLEY KRASNOW
MEYER JOSEPH TEST
BY
Campbell, Brumbaugh, Free & Graves
THEIR ATTORNEYS.

May 31, 1955  S. KRASNOW ET AL  2,709,753
TEMPERATURE COMPENSATED BORE HOLE RADIOACTIVITY APPARATUS
Original Filed Oct. 1, 1941  4 Sheets-Sheet 3

INVENTORS.
SHELLEY KRASNOW
MEYER JOSEPH TEST
BY
*Campbell, Brumbaugh, Free & Graves*
THEIR ATTORNEYS.

May 31, 1955   S. KRASNOW ET AL   2,709,753
TEMPERATURE COMPENSATED BORE HOLE RADIOACTIVITY APPARATUS
Original Filed Oct. 1, 1941   4 Sheets-Sheet 4
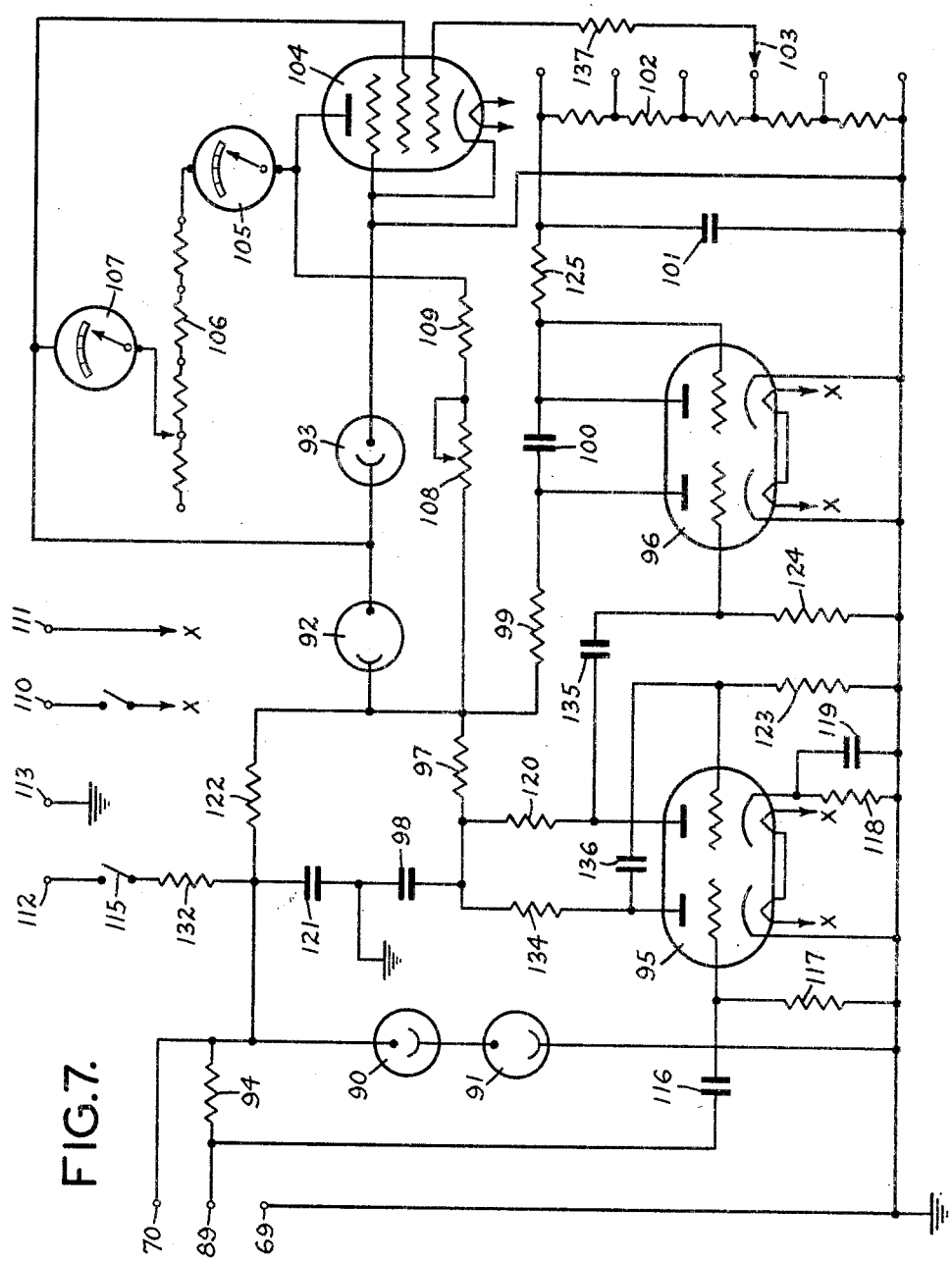
INVENTORS.
SHELLEY KRASNOW
MEYER JOSEPH TEST
BY
THEIR ATTORNEYS.

United States Patent Office 2,709,753
Patented May 31, 1955

2,709,753
TEMPERATURE COMPENSATED BORE HOLE RADIOACTIVITY APPARATUS

Shelley Krasnow, Fairfax, Va., and Meyer Joseph Test, Kansas City, Mo., assignors to Schlumberger Well Surveying Corporation, Houston, Tex., a corporation of Delaware Original application October 1, 1941, Serial No. 413,240. Divided and this application January 2, 1951, Serial No. 203,814

5 Claims. (Cl. 250—83.6)

This invention relates to apparatus for measuring radioactivity in bore holes. This subject has been taught in considerable detail in the earlier work of one of the co-inventors. The present apparatus is intended to provide improved means for the expeditious and accurate measurement of radioactivity in deep bore holes, where high temperatures also exist.

This application is a division of our copending application Serial No. 27,857, filed May 19, 1948, now Patent No. 2,640,161, for "Energizing Systems for Bore Hole Radioactivity Apparatus," which in turn is a division of our parent application Serial No. 413,240, filed October 1, 1941, for "Borehole Radioactive Apparatus," now abandoned. Portions of the subject matter disclosed in the latter application are now being claimed in the said application Serial No. 27,857, and in our copending divisional application Serial No. 27,856, filed May 19, 1948, now Patent No. 2,605,435, for "Construction of Geiger Muller Tube." The present application is addressed to other subject matter disclosed in the parent application which involves means for minimizing the effects of variations in bore hole temperature upon bore hole radioactivity apparatus.

It is an object of the invention to provide a convenient radioactive bore hole apparatus, capable of making measurements of radioactivity at a desired depth in a bore hole.

It is a further object of the invention to provide such an apparatus which will record continuously the radioactivity measured at different depths.

It is a further object of the invention to provide an apparatus which will record faithfully and will integrate pulses from a counter device operated in the bore hole.

It is a further object of the invention to obtain a heightened result in the measurement of radioactivity.

It is a further object of the invention to provide a compact counter element and associated circuit which may be contained within a narrow cartridge capable of being lowered into a bore hole.

It is a further object of the invention to provide radioactive bore hole apparatus which may be easily assembled and disassembled, and which is protected from mechanical shocks when in use.

It is a further object of the invention to provide a radioactive bore hole apparatus which does not require a primary voltage source within the cartridge.

It is a further object of the invention to provide means for using alternating current generated at the surface of the ground to provide high voltage direct current operating a radioactive measuring instrument deep in a bore hole.

It is a further object of the invention to provide an improved system for amplifying and transmitting pulses produced by a radioactive measuring system utilized in a bore hole.

Other objects and advantages of the invention will be apparent from the following drawings, in which:

Fig. 1 represents a schematic view of the apparatus as used in a bore hole;

Fig. 2 represents a longitudinal cross-sectional view of the cartridge shown in Fig. 1, showing the relative arrangement of the elements;

Fig. 3 shows a detail indicating the manner of mounting the circuit element in the embodiment shown in Fig. 2;

Fig. 3A is a schematic diagram of a typical thermostatic system for controlling the electrical energy fed to a heating coil in the apparatus shown in Fig. 2;

Fig. 4 shows an alternate system, adapted for use where temperature changes affect elements of the system;

Fig. 5 shows a longitudinal cross-sectional view of the counter tube;

Fig. 5A shows a counter tube of the type illustrated in Fig. 5 but with a double wall for thermal insulation;

Fig. 7 shows the wiring diagram of that portion of the apparatus at the surface of the earth;

Figure 6:
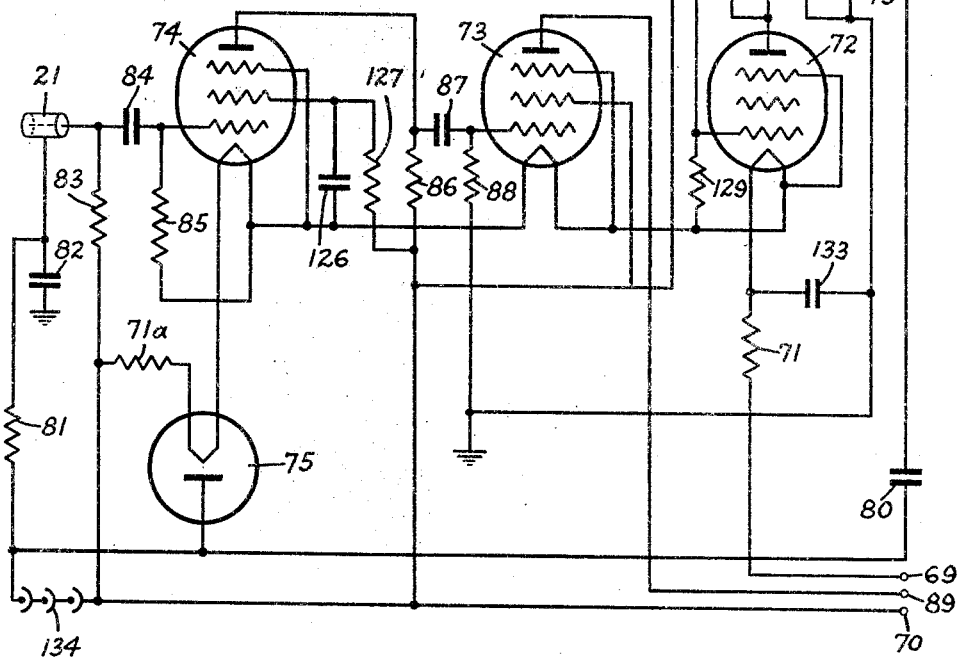
Fig. 6 shows the circuit diagram of the apparatus, indicating wiring of the parts within the cartridge.

1 represents a bore hole drilled in the earth in which may or may not exist a metallic casing 2. The bore hole may or may not be filled with liquid 3. Suspended within the bore hole is an element 4, serving to contain certain of the elements of the apparatus and to place these elements proximate to the strata from which it is desired to obtain indications. Suspending the element 4 is a multiconductor cable 5, which serves to position the element 4, to conduct energy into the said element and also to receive responses therefrom. The cable 5 passes over a measuring wheel 6, which at all times indicates the depth of the element 4, and which may be connected to other portions of the apparatus to record the depth against any other desired quantity. The wheel 6 rests upon a support 7 at the top of the bore hole. Cable 5 may be reeled or unreeled by means of a drum 8, which has slip rings allowing connection to be made during rotation and for any position of the drum to a number of stationary wires 9. These wires lead to apparatus 10 and 11, whose purpose will be hereinafter described.

Referring now particularly to Fig. 2, 12 represents the exterior of the cartridge 4. This is preferably made of a strong metal such as high strength steel, and may be provided with a corrugated exterior surface 13 where the rays are to pass through. At either end of the member 12 internally threaded portions 14 and 15 are provided into which suitable supports and closures may be fastened. At the lower end of the cartridge is a closure 16 which may be screwed into the tube 12 and which bears against a gasket represented schematically as 17 to shield the apparatus against high hydrostatic pressures. Above the upper portion of the element 16 is a threaded insert 18 which serves as a mechanical support. This bears against a coil spring 19, which in turn bears against an insulating block 20. Fastened rigidly to the insulating block 20 is a radioactive sensitive element 21. Insulating ring 22 is fastened rigidly to the upper end of the radioactive sensitive element, and a preferably metallic tube 23 rests upon the upper end of this insulator. An additional threaded insert 18a is placed above tube 23, and serves to compress a coil spring 19. This assemblage maintains the element 21 in a sort of floating support, held by springs above and below. The elements 20 and 22 will make light frictional contact against the walls of the tube 12, which will serve to damp mechanical oscillations. This may be aided by providing small springs which bear against the interior wall of the tube 12 and thus provide definite frictional contact. An upper closure 24 is provided which compresses a gasket 25 and serves to maintain the entire assemblage in fluid-tight and pressure-resistant condition. Wires lead through upper member 18a, through pressure-tight insulating bushings 26 and 27, respectively, and further to the surface of the earth. These wires are attached in mechanically strong fashion to element 24 so that they may be used to support the entire apparatus. Lying above insulating ring 22 is assemblage 28, containing the auxiliary elements and other portions required for operation. This is in the form of a relatively rigid frame upon which are mounted the vacuum tubes, condensers and resistors necessary for operation. The frame 28 rests upon springs, which may be three in number and is also held downward by springs 30, which may also be three in number.

Figure 8:
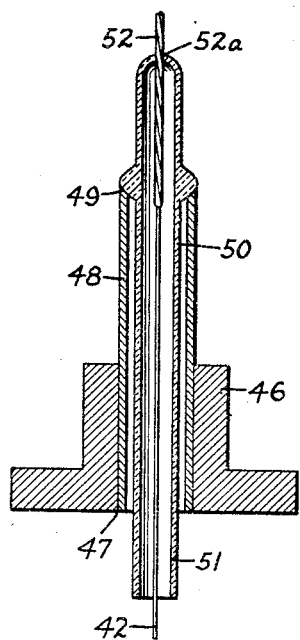
Fig. 8 shows an enlarged view of the insulator and seal, showing the method of assembly.

The element 21 employs an improved construction, which has advantages for use in measuring radioactivity in bore holes. This consists of a metallic tube 31 (Fig. 5) which may be provided with threaded ends 32, 32. Fastened to these threaded ends are internally threaded collars 33, into which are screwed externally threaded inserts 34 and 35. Both inserts have cap screws or the equivalent, 36, threaded therein and serving to bear against heads 37 and 38, respectively. Head 37 has a blind cavity 39 into which is fitted an insulating tube 40, held by some means such as a packing of lead 41. A metallic wire 42 extends from tube 40 and is firmly connected thereto. An opening 43 in head 37 has a tube, preferably a thin copper tube, fastened therein as by soldering. This passes through an opening in head 35 and may be connected to a suitable apparatus for pumping and filling the tube. A closure in the form of a well constructed needle valve 44 may be provided at the terminal portion of the tube 45. Alternatively, the tube may be pinched closed after evacuation or filling with a pair of blunt cutting nippers, or soldered shut. Head 38 has a neck portion 46 through which is provided an opening 47. Soldered into this opening is a thin metallic tube 48 (Fig. 8), which may be of copper, and which extends beyond the exterior of the head 38. At the terminal portion 49 of this tube is fastened an insulating tube 50 which may be a glass or quartz tube which is sealed to the copper by means of either soldering by standard methods, or by the use of a so-called "Housekeeper" seal. The insulating tube 50 extends inwardly forming a projecting portion 51. This serves as an electrostatic shield which prevents spurious effects in the apparatus. The wire 42 passes centrally through tube 50 and a gastight seal is formed at 52a. The wire preferably has at its end a metal of the type of tungsten 52 where the seal is to be formed.

The assemblage 28 is preferably made in the form of a unitary structure which can be inserted into the cartridge 12 or removed conveniently at will.

Figure 9:
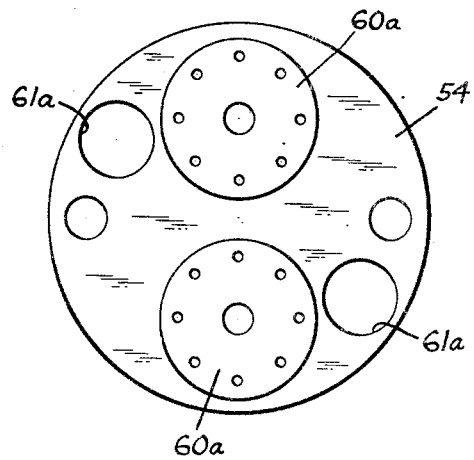
Fig. 9 shows a plan view of one of the sections shown in Figs. 3 and 4.

The assemblage 28 (Fig. 3) may be made of a number of plates such as 54, which are held in rigid spaced relation by means of rods 56, and separators 59. Nuts 58 serve to clamp the entire assemblage together. The number of rods 56 may be two, three, four, or more in number. Each of the elements 54 may be in the form of a disk of metal provided, for example, with vacuum tube sockets such as 60a (Fig. 9), and openings such as 61a, through which wired connections may be taken from one level into another. Circuit elements such as condensers represented schematically as 57 (Fig. 3) may be fastened to a plate such as 53. The entire assemblage is wired together so that only the input and output wires extend below and above respectively.

It has been found that certain elements such as condensers will have their capacity vary in proportion to the temperature. This will introduce erroneous results in some cases in the apparatus, and where such conditions exist the structure shown in Fig. 4 may be utilized. Here a frame 63, similar to frame 28 is utilized, a Dewar flask 60 being mounted on cushioned supports and held rigidly with respect to the rest of the apparatus. A plug 61 of thermal insulating material such as cork is inserted into the lower part of this flask. A circuit element such as condenser 62 may be mounted attached to this element. The assemblage will, therefore, serve to hold these elements at relatively constant temperature, and in any event to cause the changes of temperature to be very gradual.

A detail of the spring mounting of the assemblage 28 is shown in Fig. 3. Here threaded rods 56 pass through a disk 64, which is attached rigidly to the top of counter tube 21 by means of screws 65. At the lower end of the rod 56, a shoulder portion 68 is provided. Underneath this are springs 66a, which may be of coil form. Underneath disk 64 an additional set of springs is provided. Nuts are fastened at the lower portion of rod 56, thus providing a floating spring mounting for the entire assemblage 28.

Any other portion of the apparatus which is found to be temperature sensitive may be mounted inside the Dewar flask and so kept at relatively constant temperature. Where the use of a Dewar flask is objectionable, as with severe jarring which might break such a flask, a thermostatic system employing a heater coil operated from the input voltage and controlled by thermally operated relays may be utilized. The temperature for which the thermal system would be set would be the highest one expects to encounter. Regardless of the exterior temperature then, the apparatus would always operate at constant temperature. The heater coil 300 in such a case would best be placed in the gap between the insulator 20 and insert 18 (Fig. 2), suitable openings 301 and 302 being provided in members 20 and 22, respectively, to allow free circulation of air to maintain a substantially constant temperature. The heater coil 300 would have to be of large capacity, since when immersed in cold liquid, the heat loss from the cartridge would be appreciable. This heat loss may be reduced considerably by lining the entire cartridge 12 with a thin heat insulator 303. This will have relatively little stopping power for the gamma rays.

The thermostatic system for energizing the heater coil from the input voltage under the control of thermally operated relays may be of the type shown in Fig. 3A. Here the input voltage is supplied to the primary winding 304 of a transformer 305 the secondary winding 306 of which is connected to the heater coil 300. The transformer secondary winding 306 is provided with a plurality of taps 307 and 308, only two being shown in Fig. 3A, although either more or less than two may be used. Connected between one terminal of the transformer secondary winding 306 and the tap 307 is a temperature responsive relay 309. Another temperature responsive relay 310 is connected between the taps 307 and 308 and a third temperature responsive relay 311 is connected between the tap 308 and the other terminal of the secondary winding 306.

The temperature responsive relays 309, 310 and 311 are preferably designed so that when they are exposed to the temperature at the surface, their contacts are open so that the full voltage of the transformer secondary winding 306 is fed to the heater coil 300, this voltage being sufficient to maintain the temperature in the body 4 at the highest temperature expected in the bore hole. The relays 309, 310 and 311 further are adjusted so as to close their contacts for successive increments in bore hole temperature in that order. As each relay closes, it short circuits a portion of the transformer secondary winding 306, thus reducing the voltage led to the heater coil. The reduction in voltage is sufficient to maintain the temperature within the body at the value corresponding to the highest temperature expected in the bore hole.

The Geiger Muller tube itself, in many cases, will be found to be sensitive to temperature and to require different operating voltages at different temperatures. The Geiger Muller tube may have an outer wall 31 made double, with an annular cylindrical space 312 which is evacuated, as shown in Fig. 5A. Thus, the tube will be thermally insulated against external temperature change.

It will be noted that the spring mountings for the counter tube 21 and the assemblage 28 are individual. The tube structures should preferably have different periods of oscillation so as to tend to suppress oscillations. It is understood that the unitary assemblage 28, may hold the elements of any desired circuit or auxiliary apparatus to operate the radioactive sensitive element, and to receive responses therefrom.

Referring now particularly to Fig. 6, 69 and 70 represent the input power lead of the apparatus, 69 being a grounded negative lead, and 70 being a positive lead. The voltage between these two may be 220 and 250 volts or any other desired value. This voltage is applied to the filaments of the various vacuum tubes 72, 73, 74 and 75, through resistors 71 and 71a. This reduces the voltage to the proper value for all the filaments appearing. The voltage across resistor 71a is also applied to the plates of the various vacuum tubes as shown. An oscillatory circuit is provided comprised chiefly of vacuum tube 72, transformer 78, condenser 79, and condensers 130 and 131. This generates a high voltage by oscillation at a suitable frequency which may be 200 kilocycles. This voltage is applied across the rectifier tube 75, which furnishes a high direct current voltage through resistor 81 and across Geiger Muller counter tube 21. Condenser 82 serves to improve the filtering of the direct current voltage furnished to the Geiger Muller tube. The pulses produced by the breakdown or discharge of the Geiger Muller tube 21 are quenched by resistor 83. Such pulses are fed to condenser 84 and across resistor 85 placed between the filament and the grid of amplifier 74. Tube 74 and resistance capacity coupled amplifier 73 both serve several functions. Tube 74 serves to amplify the pulses produced by the Geiger Muller tube 21, and to invert these pulses. The original pulse is a negative one and is inverted to form a positive pulse. Tube 73 is operated as a Class C amplifier so that the system will be unresponsive to microphonics. It also serves to sharpen the Geiger Muller tube pulses. As shown, the system will respond only to appreciable pulses of the size produced by the Geiger Muller tube. The final amplified pulse is then led through wire 89 to the surface of the ground. Condenser 79 serves to tune the secondary of the transformer 78 so as to obtain a desired frequency.

The voltage output of the oscillator may be altered by detuning. This may be done by an automatically controlled condenser such as 79, and the change may be made responsive to temperature within the cartridge. Thus, a small capacity condenser with one plate made of bimetal, which will move to or from the stationary plate, depending on temperature, may be utilized. The bimetal condenser may be of the type disclosed in prior Patent No. 1,862,931 to Gunn, for example. Thus, the voltage may be altered automatically so as to be the proper value for operating the Geiger Muller tube, whose voltage characteristic sometimes changes with temperature.

If desired, the resistor 129 may be made of sufficiently high value to cause the oscillator to block intermittently, thus decreasing plate current of 72. This will produce a transient oscillation or superregenerative oscillation in the coil 76.

It will be noted that the external voltage across the terminals 69 and 70 will be added to the rectified voltage fed to the Geiger Muller tube 21. This is of advantage in obviating the necessity of having the oscillatory circuit alone produce a high enough voltage to operate the counter tube.

Fig. 7 shows the portions of the apparatus which are preferably kept above ground. Here the terminals which are connected below ground are numbered in the same fashion. It will be seen that the input of this apparatus, which is the output of the apparatus below ground is represented by 89. This amplified pulse is, therefore, applied across resistor 94 between terminals 70 and 89. Amplification is performed by resistance capacity coupled amplifier tube 95 and one section of tube 96. Amplification by tube 95 may be omitted, particularly if "cable" noises or other disturbances are troublesome. The resistor 97 and condenser 98 act as a plate supply filter for the amplifier tube 95 and prevent self-oscillation through plate coupling. Due to overloading of the tube 96, or the operation of the said tube at a suitable portion of its characteristic, all pulses resulting from tube 96 will be of equal magnitude no matter what the size of the pulse originally fed to the apparatus. This is desirable since the number of pulses is the criterion of importance in a counter of this type, rather than the size of the pulses or the integrated average of the size of the pulses.

Where the output of the radioactive sensitive member is proportional to radioactivity, the tube 96 will be operated at that portion of its characteristic which will give a value proportional to the input. Thus, if a "proportional" counter is used, or one in which the size of the pulse is dependent on the radioactive intensity, the tube 96 can be operated at the approximately linear part of its characteristic so as to give an output proportional to the size of the input pulse.

The leveled pulses resulting from amplification by tube 96 are applied through condenser 100, across the right-hand section of the same tube, operating as a diode rectifier. This rectifier charges condenser 100, which further charges condenser 101, through resistor 125. The voltage across condenser 101 is, therefore, proportional to the frequency of the pulses originally produced by the Geiger Muller tube. This voltage is applied across a "step ladder attenuator" 102, with a switch 103, to select a suitable tap thereof. The voltage output of the attenuator is applied across tube 104, which has a milliammeter 105 in its plate circuit. The plate current will be proportional to the grid voltage, and, therefore, will also be proportional to the number of pulses. The meter 105 will, therefore, read the integrated average of the pulses produced by the Geiger Muller counter.

In series with meter 105 is an adjustable resistance 106, which is connected in series with an external meter 107. The external meter may be a recording type while the meter 105 is an ordinary indicator type. The instrument will, therefore, indicate and record simultaneously. The two meters may be placed at different localities. Alternatively meter 107 may be replaced by any current sensitive or current responsive device. The attenuator 102 acts as a range device. Since any proportion of the voltage appearing between the output terminals of the attenuator may be applied across the vacuum tube 104, the range of the apparatus may be changed as desired.

The input high direct current voltage is applied to terminals 112 and 113 and is controlled by the switch 115. A resistor 132 enables voltage from 112 and 113 to be stabilized by tubes 90 and 91 for application across terminals 69 and 70. The voltage regulators 92 and 93 which are gas discharge tubes connected in series, serve to supply accurate grid and plate voltages for the various tubes so as to assure accurate and stable operation thereof. The gas discharge voltage regulator tubes 90 and 91 serve to supply a constant direct current voltage to be fed through terminals 69 and 70 to the apparatus below ground. Alternatively, the voltage regulator tubes 90 and 91 may be mounted in the cartridge 4. In order to set the meters 105 and 107 to zero, a bucking circuit comprised by resistors 108 and 109 is provided. Adjustable resistor 108 is used as the zero setting resistor.

The filament voltage for the tubes which are operated at the surface of the ground, is supplied preferably by a six volt or other suitable voltage supply operated by switch 114, and furnished through supply terminals 110 and 111.

Because of the high temperatures often met with in deep bore holes, it will be found necessary when transformers or other similar electrical elements are utilized, to have these units provided with an insulating varnish capable of withstanding the temperatures encountered. The same remark applies to the resistors and condensers, although where these elements are maintained in a constant temperature enclosure as pointed out herein, such elaborate precautions are often unnecessary.

Various elements in the different circuits have been shown without a description being given of their exact function. The function of these elements may be told from their relative positions in the respective circuits by those versed in the art.

A representative set of values which has been found to give good results is as follows:

| | |
|---|---|
| 82—.01 mfd. | 98—5 mfd. |
| 81—$10^8$ ohm | 71a—4,000 ohm |
| 134—T-2 neon lamps | 75—High voltage rectifier |
| 83—$10^9$ ohm | 85—$10^8$ ohm |
| 84—.000076 mfd. | 74—1 LN 5 |
| 127—5 meg. | 126—.0001 mfd. |
| 86—1 meg. | 134—0.1 meg. |
| 87—.000075 mfd. | 136—.000075 mfd. |
| 88—1 meg. | 120—0.1 meg. |
| 73—1 LB 4 | 118—3,000 ohm |
| 130—.001 mfd. | 119—20 mfd. |
| 131—.0006 mfd. | 123—¼ meg. |
| 78—High frequency dust core transformer | 124—¼ meg. |
| | 122—1,000 ohm |
| 79—3-15 mmfd. | 97—50,000 ohm |
| 80—.01 mfd. | 96—7F7 |
| 129—5 meg. | 99—75,000 ohm |
| 133—.01 mfd. | 100—.0005 mfd. |
| 71—1,250 ohm. | 92—VR-75 |
| 94—10,000 ohm. | 93—VR-105 |
| 90—VR-150 | 108—5,000 ohm. |
| 91—VR-105 | 109—10,000 ohm. |
| 116—.0001 mfd. | 125—20 meg. |
| 117—¼ meg. | 101—1 mfd. |
| 72—1 LB 4 | 104—7C7 |
| 95—7F7 | 105—0-5 milliampere range |
| 132—250 ohm | 135—.000075 mfd. |
| 121—20 mfd. | 137—50 meg. |

The current drawn by even a large Geiger-Muller tube is exceedingly small, being of the order of $\frac{1}{10}$ of a microampere.

While the specific embodiment has been drawn chiefly to a Geiger Muller system, it will be understood that most of the members can be applied to other systems such as those utilizing ionization chambers. Thus, the construction of the tube and the mode of its use may be applied to an ionization chamber apparatus. Further, the high voltage may be applied in the same way. The transmitting circuits and the association of the circuit elements may also be utilized in ionization chamber assemblages.

The scope of the invention is indicated by the appended claims.

We claim:

1. In an apparatus for the measurement of radioactivity within a bore hole, a cartridge adapted to be lowered within the bore hole, and to contain elements responsive to radioactivity therein, said cartridge having within it a radioactive sensitive element to be supplied with a voltage whose value depends upon the temperature, means to receive a voltage from the surface of the earth, and to apply a proper operating voltage for the said radioactive sensitive element, the aforesaid means having combined therewith a temperature compensated element adapted to vary the voltage supplied to the said radioactive element in proportion to the temperature in said bore hole.

2. The method of detecting radiation wherein an instrument capable of detecting radiations encounters regions of varying temperature which comprises impressing a direct current potential on an electrode of a radiation detector of the counter type to yield current pulses, as a result of radiations, and varying the potential impressed on the electrodes of said detector directly as a function of the temperature encountered by said detector, thereby maintaining the detector in effective operating condition.

3. In a well logging apparatus in which a radioactivity responsive chamber for measuring penetrative radiation is passed through a well, said radioactivity responsive chamber being capable of generating an electrical current of a fraction of a microampere that is a function of the intensity of said radiation, a resistor having a magnitude of the order of a billion ohms connected in the output circuit of said radioactivity responsive chamber, an instrument for measuring the voltage drop across said resistor and temperature controlling means for maintaining said resistor at a predetermined temperature during the passage of the instrument through the hole.

4. In well logging apparatus, the combination of a cartridge adapted to be lowered into a well, a radioactivity responsive device in the cartridge, said device including an element to be supplied with voltage, electric oscillator means including a tuned electrical circuit in the cartridge, means for rectifying the output of said oscillator means, filter means for smoothing the output of said rectifier means, circuit means for supplying said smoothed output to said element of the radioactivity responsive device, and thermally responsive capacitance means connected to said tuned circuit for varying at least one property of said tuned circuit as a function of the temperature in the well, thereby also varying the voltage applied to said element of the radioactivity responsive device as a function of the temperature in the well.

5. In an apparatus for measuring radioactivity within a deep narrow bore hole, a cartridge capable of being lowered to a desired depth within a bore hole, and to contain elements responsive to a radioactivity therein, power supply means in said cartridge adapted to receive a voltage from the surface of the earth, a radioactivity detecting means within said cartridge and supplied with a proper operating voltage from said power supply means, means to transmit the responses from said radioactivity detecting means to the surface of the earth, means to receive the said responses, the responses of said detecting means being dependent not only upon the radioactivity in the vicinity of said cartridge but upon the operating voltage and temperature of said detecting means, means defining an evacuated insulating space at least partially surrounding said detecting means and serving to prevent substantial alteration in response thereof due to the temperature variations in said bore hole, and means adapted to regulate the voltage applied to said detecting means by said power supply means, whereby the response of said detecting means while traversing said bore hole is less subject to undesired variation.

References Cited in the file of this patent

UNITED STATES PATENTS

| | | |
|---|---|---|
| 1,191,508 | Hartung | July 18, 1916 |
| 1,818,221 | Huber | Aug. 11, 1931 |
| 1,994,228 | Osnos | Mar. 12, 1935 |
| 2,133,776 | Bender | Oct. 18, 1938 |
| 2,167,630 | Bazzoni et al. | Aug. 1, 1939 |
| 2,240,478 | Bischoff et al. | May 6, 1941 |
| 2,414,862 | Fearon | Jan. 28, 1947 |
| 2,433,554 | Herzog | Dec. 30, 1947 |
| 2,493,535 | Herzog | Jan. 3, 1950 |

FOREIGN PATENTS

| | | |
|---|---|---|
| 283,596 | Great Britain | May 17, 1928 |